US010295825B2

(12) United States Patent
Irzyk

(10) Patent No.: US 10,295,825 B2
(45) Date of Patent: May 21, 2019

(54) PROJECTION SYSTEM FOR DISPLAY, IN PARTICULAR A HEADS-UP DISPLAY, AND ASSOCIATED DISPLAY

(71) Applicant: VALEO COMFORT AND DRIVING ASSISTANCE, Créteil (FR)

(72) Inventor: Michael Irzyk, Creteil (FR)

(73) Assignee: VALEO COMFORT AND DRIVING ASSISTANCE, Créteil (FR)

(*) Notice: Subject to any disclaimer, the term of this patent is extended or adjusted under 35 U.S.C. 154(b) by 0 days.

(21) Appl. No.: 15/526,017

(22) PCT Filed: Nov. 20, 2015

(86) PCT No.: PCT/FR2015/053164
§ 371 (c)(1),
(2) Date: May 11, 2017

(87) PCT Pub. No.: WO2016/079457
PCT Pub. Date: May 26, 2016

(65) Prior Publication Data
US 2017/0322415 A1    Nov. 9, 2017

(30) Foreign Application Priority Data
Nov. 21, 2014   (FR) ..................................... 14 02638

(51) Int. Cl.
*G02F 1/1335*    (2006.01)
*G02B 27/01*     (2006.01)

(52) U.S. Cl.
CPC ... *G02B 27/0101* (2013.01); *G02F 1/133536* (2013.01); *G02F 1/133603* (2013.01);
(Continued)

(58) Field of Classification Search
CPC ... G02F 2001/133607; G02F 1/133603; G02F 1/133606
See application file for complete search history.

(56) References Cited

U.S. PATENT DOCUMENTS 7,997,771 B2 *  8/2011  Epstein ................ G02B 3/0056
                                              362/339
2006/0007553 A1  1/2006  Bogner et al.
(Continued)

FOREIGN PATENT DOCUMENTS

EP    2 690 484 A1    1/2014

OTHER PUBLICATIONS

International Search Report issued in PCT/FR2015/053164 dated Feb. 12, 2016 (2 pages).
(Continued)

*Primary Examiner* — Kendrick Hsu
(74) *Attorney, Agent, or Firm* — Osha Liang LLP

(57) ABSTRACT

The invention relates to a projection system for a display, in particular a heads-up display, comprising a liquid crystal screen (12) and a back-lighting device (14) for said screen (12). The projection system is characterized in that said back-lighting device (14) comprises at least one light source (16) emitting light towards the screen (12), at least one lens (38*a*, 38*b*) suitable for collimating the light from the light source (16) towards the liquid-crystal screen (12), and reflective means (26) arranged on the surface of the lens (38*a*, 38*b*) located on the side of the light source (16), arranged such as to allow light to pass through same towards the screen (12) and to reflect towards the screen (12) almost all of the light propagating towards the lens (38*a*, 38*b*).

20 Claims, 2 Drawing Sheets

Figure 1:
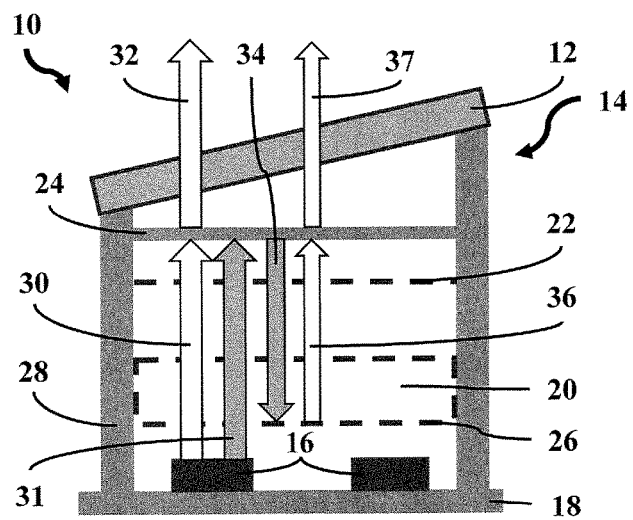

(52) U.S. Cl.
CPC .. *G02F 1/133605* (2013.01); *G02F 1/133606* (2013.01); *G02B 2027/0118* (2013.01); *G02F 2001/133607* (2013.01)

(56) References Cited

U.S. PATENT DOCUMENTS

| | | | | |
|---|---|---|---|---|
| 2006/0163596 A1* | 7/2006 | Kim | ............... | G02F 1/133603 257/98 |
| 2008/0019114 A1* | 1/2008 | Stuyven | ............... | G02B 6/0055 362/23.18 |
| 2009/0207586 A1* | 8/2009 | Arai | ............... | G02B 5/021 362/97.1 |
| 2012/0293979 A1* | 11/2012 | Zhang | ............... | G02F 1/133611 362/84 |
| 2013/0176292 A1* | 7/2013 | Li | ............... | G02F 1/133603 345/207 |
| 2014/0286000 A1* | 9/2014 | Cho | ............... | G02F 1/133606 362/97.1 |
| 2015/0268513 A1* | 9/2015 | Chang | ............... | G02F 1/133605 362/97.1 |

OTHER PUBLICATIONS

Written Opinion of the International Searching Authority issued in PCT/FR2015/053164 dated Feb. 12, 2016 (6 pages).

* cited by examiner

PROJECTION SYSTEM FOR DISPLAY, IN PARTICULAR A HEADS-UP DISPLAY, AND ASSOCIATED DISPLAY

1. TECHNICAL FIELD OF THE INVENTION

The invention concerns projection systems, particularly for heads-up displays. In particular, the invention concerns a projection system and a heads-up display intended for a motor vehicle.

2. TECHNOLOGICAL BACKGROUND

It is known to outfit a motor vehicle with a display system, known as a heads-up display. Such a system is placed in the field of vision of the driver of the vehicle and it displays one or more pieces of information regarding the state of the vehicle, the traffic, or something else.

This type of heads-up display for a motor vehicle requires the obtaining of an image with sufficient luminosity for the user, and especially the driver of the vehicle, to be able to see the image sufficiently, and in every situation, according to the weather conditions and/or the time of day.

Among the possible technologies for forming such an image thanks to the display the technology most often used in the prior art is that of a liquid crystal screen, particularly a thin film transistor liquid crystal screen (TFT-LCD). These TFT-LCD screens in order to display an image require a back-lighting provided by a light source, generally by a plurality of light-emitting diodes (LEDs). In practice, this TFT-LCD screen and the back-lighting are comprised in an assembly known as an image projection system.

Even so, these TFT-LCD screens have the drawback of reducing in substantial manner the luminous power coming from the back-lighting: with the use of a classical TFT-LCD screen, it is estimated that the transmission level of the screen is around 5% of the luminous power of the back-lighting. This low value is due in particular to the first polarizer present in the screen, which only lets through the light corresponding to a certain polarization, whereas the LEDs produce light with several polarizations: thus, all the polarizations not corresponding to the one let through by the polarizer are lost.

Hence, in order to display an image by the display with a sufficient luminous power, it is necessary to use a back-lighting of significant luminous power, since the image displayed will have a luminous power of the order of 5% of this back-lighting power. This results in significant energy consumption, as well as significant losses in the form of heat, which furthermore may degrade the components and thus require the use of bulky heat dissipators.

3. OBJECTIVES OF THE INVENTION

The invention intends to mitigate at least some of the drawbacks of the known projection systems and displays.

In particular, the invention also intends to provide, in at least one embodiment of the invention, a display which enables the displaying of an image with sufficient luminous power.

The invention also intends to provide, in at least one embodiment, a display and a projection system which allow the use of a back-lighting with a more reduced power and thereby allow the energy consumption and the dissipation of heat to be reduced.

The invention also intends to provide, in at least one embodiment of the invention, a display and a projection system of reduced size.

The invention also intends to provide, in at least one embodiment, a projection system comprising a limited number of optical interfaces.

4. EXPLANATION OF THE INVENTION

To accomplish this, the invention concerns a projection system for a display, especially a heads-up display, comprising:
- a liquid crystal screen,
- a back-lighting device for said screen,
- characterized in that said back-lighting device comprises:
  - at least one light source emitting light in the direction of the screen,
  - at least one lens adapted to collimate the light coming from the light source in the direction of the liquid crystal screen,
  - reflective means disposed on the face of the lens situated on the side with the light source, designed to let the light pass through in the direction of the screen and reflect toward the screen nearly all of the light propagating in the direction of the lens.

A projection system according to the invention thus enables the recycling of the light emitted by the light source of the back-lighting device resulting from a reflection of part of the light in the direction of the light source, this reflection being caused by the light passing through various elements placed between the light source and the screen, as well as by the screen itself. The assembly of these elements is known as the optical system. This portion of light again passes through the optical system and is then reflected at the reflective means disposed between the light source and the screen so as to be sent back in the direction of the screen. The optical system and the reflective means produce a modification in the characteristics of the portion of light which is reflected. By passing again through the optical system in the direction of the screen, this light will be partly transmitted toward the screen and partly reflected back in the direction of the support plate. The arrangement of the reflective means on the lens or lenses makes it possible not to add supplemental elements in the optical system, which allows a reduction in costs and a limitation in the number of elements of the optical system letting through the light reflected by the reflective means, said elements being themselves an optical interface which can produce stray reflections which it is important to limit.

Advantageously and according to the invention, the reflective means have a coefficient of reflection greater than 90%, preferably greater than 98%. Preferably, the reflection obtained thanks to the reflective means is of specular type, that is, a ray impinging on the means of reflection produces a single reflected ray after reflection.

Advantageously and according to the invention, the light source is a light-emitting diode.

The light-emitting diode has a reduced size and is able to emit a directional light allowing a good illumination of the screen.

Advantageously and according to the invention, the device comprises a plurality of light sources.

Advantageously and according to the invention, the device comprises a plurality of lenses forming at least one array of lenses connected by support means.

Advantageously and according to the invention, the plurality of lenses and the support means are formed of the same material, such as by molding.

According to this aspect of the invention, the fabrication of an array of lenses is made easier and the number of parts in the system is reduced.

Advantageously and according to the invention, each lens array comprises a number of lenses equal to the number of light sources of the projection system.

According to this aspect of the invention, the presence of a multitude of lenses enables better efficiency of collimation of the light coming from the light sources.

Advantageously, the device comprises a plurality of lens arrays enabling a better collimation of the light coming from the light source. In this case, the reflective means are disposed only on the lenses of the lens array closest to the light source.

Advantageously and according to the invention, reflective means are likewise disposed on the support means connecting the lenses.

According to this aspect of the invention, the surface covered by the reflective means is more sizeable and allows a reflecting of nearly all the light directed toward the lenses.

Advantageously and according to the invention, the reflective means are a reflective coating deposited on the lenses.

Advantageously and according to the invention, the reflective means are a metallic coating. Advantageously, the metallic coating has a smooth surface enabling a reflection of specular type, and a significant level of reflection, which improve the performance of the back-lighting device.

Advantageously and according to different embodiments of the invention, the coating is either bonded to the lenses, such as by glue, or by vacuum metallization when said coating is metallic.

Advantageously and according to this latter aspect of the invention, the metallic coating is aluminum.

According to this aspect of the invention, the aluminum provides good reflectivity and good heat dissipation. The aluminum coating can advantageously be protected, in particular, against outside moisture, by a deposition of silicon dioxide ($SiO_2$) or titanium dioxide ($TiO_2$).

Advantageously and according to the invention, the back-lighting device comprises at least one filter for recycling the light emitted by the light source, situated between the light source and the screen, ensuring the transmission of some of the light toward the screen and the return of the light not transmitted toward the light source.

According to this aspect of the invention, the recycling filter enables a sending back of some of the light in the direction of the light source. This portion of reflected light is advantageously light whose characteristics are not in accordance with the characteristics needed for a good-quality back-lighting, especially because this portion of light would have been lost in the area of the liquid crystal screen. This portion of light is then reflected at the reflective means in the direction of the screen. This reflection as well as the passage through the different elements of the optical system enables a modification of the characteristics of the light returning to the recycling filter.

Advantageously and according to the invention, at least one light recycling filter is a polarization filter adapted to let through the light arriving at the polarization filter with a particular polarization and adapted to reflect the light arriving at the polarization filter with a different polarization from the particular polarization.

According to this aspect of the invention, the liquid crystal screen only lets through the light having a particular polarization on account of the presence of a polarizer in the screen, and so the polarization filter is able to reflect the portion of the light whose polarization is different from this particular polarization. The light usually lost in the area of the liquid crystal screen is thus reflected toward the reflective means. The reflective means and the optical system enable a modification of the polarization of the reflected light, and this light reflected in the direction of the screen is again filtered by the polarization filter.

Advantageously and according to the invention, at least one light recycling filter is a prismatic filter adapted to let through the light arriving at the prismatic filter with an angle of incidence less than a predetermined angle and in a given plane, and adapted to reflect the remaining portion of the light.

According to this aspect of the invention, the prismatic filter only lets through the light arriving substantially perpendicular to the filter in a given plane, in order to enable a reduction in the divergence of the light in the direction of the liquid crystal screen. The light reflected by the prismatic filter is again reflected at the reflective means and returns to the prismatic filter, and some of this reflected light arriving at the filter with an angle of incidence less than the predetermined angle passes through the filter and another portion is again reflected.

Advantageously and according to the invention, the back-lighting device comprises at least two prismatic filters, each one filtering according to the incidence of the light in a plane, and disposed so that the planes in which they filter the incidence are substantially perpendicular.

According to this aspect of the invention, the adding of a second filter filtering in a given plane different from the first filter enables the filtering of a greater portion of the light.

Advantageously and according to the invention, the back-lighting device comprises a diffuser adapted to homogenize the light coming from the light source.

According to this aspect of the invention, the homogenization of the light enables a good distribution of light on the liquid crystal screen. The diffuser furthermore enables a masking of the interior of the back-lighting device.

Advantageously and according to the invention, the liquid crystal screen is inclined at a predefined angle with respect to the recycling filter or filters.

According to this aspect of the invention, the predefined angle makes it possible to obtain a vertical virtual image in the context of the use of the projection system in a heads-up display.

Advantageously and according to the invention, the device comprises a box surrounding the space of the device between the light source and the screen and whose interior walls are reflective.

According to this aspect of the invention, the box enables the reflection of the light not propagating in a straight line between the light source and the liquid crystal screen, in one direction or another: the box allows this light not to be lost by having it propagate solely in the space between the light source and the liquid crystal screen.

Advantageously and according to the invention, the system comprises, successively and in this order, between the light source and the screen:
  the lens array,
  the diffuser,
  the prismatic filter or filters,
  the polarization filter.

The invention likewise concerns a display, especially a heads-up display, comprising an image projected system according to the invention.

The invention likewise concerns a projection system and a display characterized in combination by all or some of the characteristics mentioned above or below.

5. LIST OF FIGURES

Figure 2:
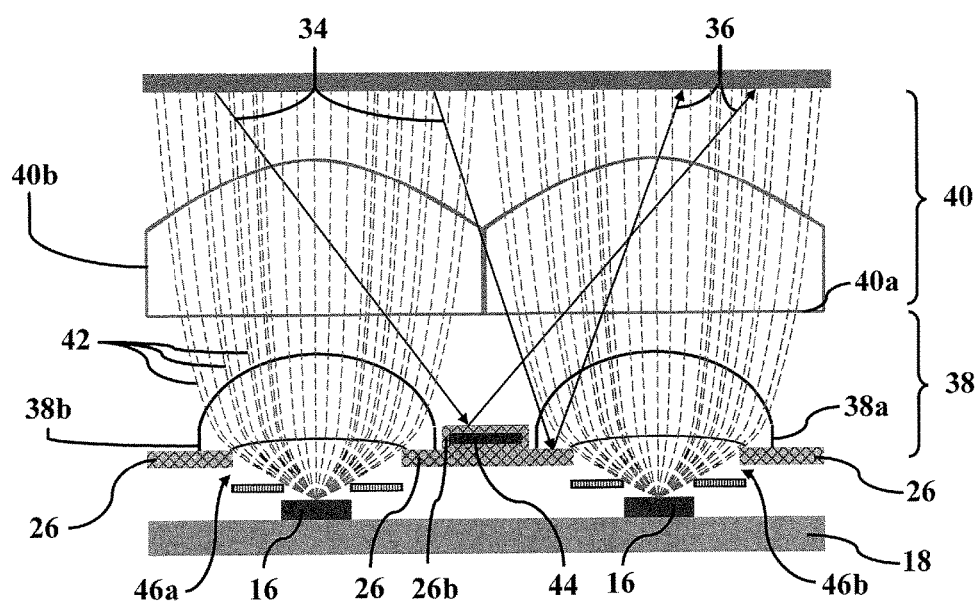
Figure 3:
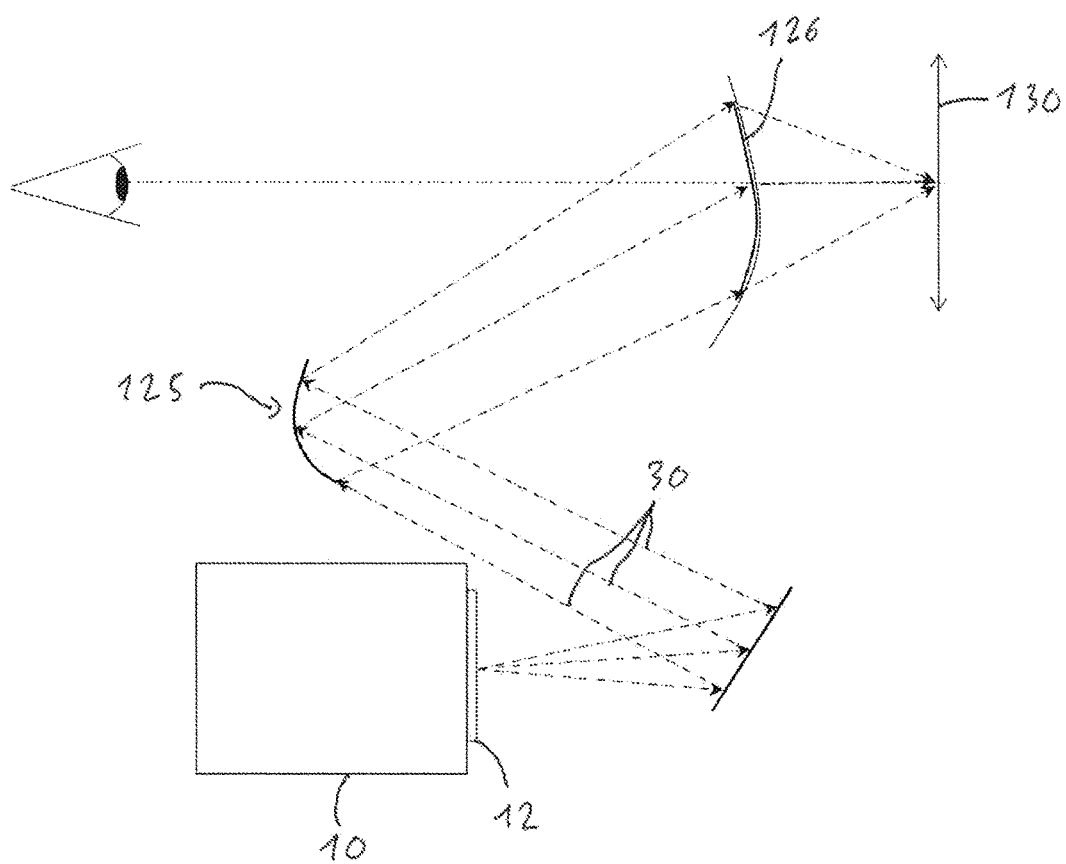

Other purposes, characteristics, and advantages of the invention will appear upon perusal of the following description given solely in nonlimiting manner and referring to the appended figures in which:

FIG. 1 is a schematic view of a cross section of a projection system according to one embodiment of the invention, FIG. 2 is a detailed schematic view of a cross section of a projection system according to one embodiment of the invention, FIG. 3 is a schematic view of an image projection system and a heads-up display according to the invention.

6. DETAILED DESCRIPTION OF ONE EMBODIMENT OF THE INVENTION

The following embodiments are examples. Even though the description refers to one or more embodiments, this does not necessarily mean that each reference concerns the same embodiment, or that the characteristics apply only to a single embodiment. Single characteristics of different embodiments can likewise be combined in order to produce other embodiments.

FIG. 1 represents a schematic view of a cross section of an image projection system 10 according to one embodiment of the invention.

The projection system 10 comprises a liquid crystal screen, here, a thin film transistor liquid crystal screen 12, and a back-lighting device 14. The thin film transistor liquid crystal screen 12 (TFT-LCD) allows the formation of the image by the projection system 10.

The back-lighting device 14 has the function of providing to the screen 12 the light needed to form the image. To do this, the back-lighting device 14 comprises in particular at least one light source. For example, in this embodiment, the light source is composed of at least one and preferably a group of light-emitting diodes (LEDs) 16, here being two in number, placed on a support plate. In this embodiment, the support plate is formed by a printed circuit (PCB) 18. The printed circuit used may be for example of FR4 type (Flame Resistant 4) or IMS (Insulated Metal Substrate) type. The use of an IMS circuit in particular enables a better heat dissipation. The printed circuit 18 enables both the physical support and the electrical connection (to a power supply and to any other electronic components, not shown) for the LEDs 16. The LEDs 16 are placed in order to emit light in the direction of the screen 12. The screen 12 is inclined at a predefined angle, preferably between 0° and 40°, so as to obtain a vertical virtual image in the context of the use of the projection system in a heads-up display.

Between the screen 12 and the LEDs 16 are located various elements for the processing and/or filtering of the light, in order to optimize the back-lighting, known altogether as the optical system. In the embodiment presented in FIG. 1, these elements which are part of the back-lighting device 14 and which the light coming from the LEDs 16 passes through successively in the direction of the screen 12 are:

at least one lens, and preferably as used in this embodiment an array 20 of lenses, allowing the collimation of the light coming from the LEDs 16 to limit the losses of luminous power if part of the light is not directed toward the screen 12. Generally, the array 20 of lenses comprises one lens per LED 16, each lens being disposed on top of each LED 16. The lenses of the array 20 of lenses are interconnected by support means.

a diffuser 22, enabling homogenization of the light, in order to illuminate the screen 12 in homogeneous manner to allow the formation of a good-quality image, that is, an image with substantially uniform luminosity. Moreover, the diffuser 22 allows a masking of the interior of the back-lighting device.

one or more recycling filters, grouped together under the reference 24, for example:

two intersecting prismatic filters, letting through the light arriving at the prismatic filters with an angle of incidence less than a predetermined angle and in a given plane perpendicular to the plane of the prismatic filter. A light beam arriving at a prismatic filter with an angle of incidence greater than the predetermined angle and in a plane different from the given plane will be all the more reflected as said plane of incidence of the beam is different from the given plane. Thus, the use of the two intersecting prismatic filters, especially ones filtering in substantially perpendicular planes, makes it possible to filter the major portion of the light beams so that the light beams arriving at the filter outside of a cone of incidence with angle equal to the predetermined angle will be reflected. The prismatic filters here are films of polymer material composed of a multitude of micro-prisms aligned in the plane of the prismatic filter along lines perpendicular to the given plane. This type of film is marketed for example by the 3M company under the name BEF (Brightness Enhancement Film).

a polarization filter, letting through the light arriving at the polarization filter with a particular polarization and adapted to reflect the light arriving at the polarization filter with a different polarization. Since the light emitted by the LEDs 16 is a non-polarized light, only the portion of this light having a polarization co-linear with this particular polarization will pass through the polarization filter, the rest of the light being reflected. The polarization filter here is a film of polymer material. This type of filter is marketed for example by the 3M company under the name DBEF (Dual Brightness Enhancement Film).

Thus, the different recycling filters 24 make it possible for example to reflect the light which would have been filtered in the area of the screen 12 itself on account of its internal components, especially the rectilinear polarizers, by reflection of the light not having a particular polarization, or to reflect the light that was propagating in too broad a cone of illumination. This portion of the light reflected by the recycling filter or filters in the direction of the printed circuit is termed hereafter recycled light.

So as not to lose this recycled light, the projection system 10 comprises reflective means 26, here disposed on the face of the array of lenses situated on the side with the light source, and designed to let pass the light through in the direction of the screen and to reflect toward the screen nearly all the recycled light which then propagates once more toward the screen 12. The reflective means 26 are represented here by a dotted line for the outline of the array of lenses and shall be detailed with reference to FIG. 2.

In order for the light propagating from the array 20 of lenses to the screen 12 or from the screen 12 to the array 20 of lenses to remain in the back-lighting device 14, the space contained therein between the printed circuit 18 and the screen 12 is surrounded by a box 28, generally called a light box especially in the automotive field. To prevent losses of luminous power in the box 28 by absorption of light, it is made of reflective material such as polycarbonate (PC). For an optimal reflection of the light, the box 28 should have a very planar polished surface.

This reflective means 26, the optical system and the box 28 by virtue of the reflection of the light on or through their respective surfaces make it possible to modify the characteristics of the recycled light, especially its polarization and its direction of propagation. Thus, the recycled light which is reflected by the reflective means 26 and which propagates in the direction of the screen 12 has a different polarization and a different angle of incidence with the recycling filter or filters, and thus it may pass through the recycling filter or filters 24 if these characteristics allow the passage of the light through the recycling filter or filters 24. If the light still does not have the characteristics necessary for crossing the recycling filter or filters, the light is again recycled and the previously described cycle is repeated.

This cycle is represented in FIG. 1 by arrows 30, 31, 32, 34, 36, 37. The LEDs 16 emit nonpolarized light. Two arrows 30, 31 represent two portions of this polarized light, with respective polarizations P1 and P2. The polarization filter lets through the portion of the light whose polarization is equal to P1. The portion of the light with polarization P1 thus passes through the polarization filter and is directed toward the screen 12 in the direction represented by the arrow 32, and the portion of the light with polarization P2 is recycled, that is, reflected toward the printed circuit 18, as represented by the arrow 34. This portion of the recycled light 34 is reflected at the reflective means 26 in the direction of the screen 12, and a portion of this reflected light has a modified polarization now equal to P1, as represented by the arrow 36. Thus, this portion of the reflected light 36 of polarization P1 crosses through the polarization filter after the recycling and the reflection, as represented at the arrow 37. The same phenomenon occurs in analogous manner as a function of the angle of incidence of the light, thanks to the prismatic filters.

FIG. 2 shows schematically a more detailed view of the back-lighting device according to one embodiment of the invention. The back-lighting device comprises the LEDs 16, a first array 38 of lenses and, for example, a second array 40 of lenses. In this example, the lighting device comprises two LEDs 16, and each array of lenses comprises two lenses 38a, 38b, 40a, 40b, each of the lenses being disposed on top of an LED 16. The light emitted by the LEDs passes successively through the two arrays 38, 40 of lenses and they make possible, as can be seen in the figure, a collimation of the rays of light 42 by successive rectification of these rays of light 42 in passing through the lenses of the arrays of lenses.

The LEDs 16 are arranged on the printed circuit 18, and the first array 38 of lenses is disposed at a distance preferably between 0.1 mm and several millimeters from the printed circuit 18. For example, the first array 38 of lenses is disposed at around one millimeter from the printed circuit 18 in order to make a compromise between the improved dissipation of the heat produced by the LEDs 16 upon emission of light and the optical performance of the lenses 38a, 38b of the first array 38 of lenses.

The lenses 38a, 38b of the first array 38 of lenses are connected by support means 44 of the lenses, which furthermore make it possible to hold the lenses in place in the back-lighting device, being for example joined to the box 28 described in reference to FIG. 1. These support means 44 can be made of the same material as the lenses, for example, and fabricated at the same time as the latter during a molding of the array of lenses. The support means 44 can also be fabricated separately and/or be made of a different material and receive the lenses of the array of lenses by an assembly process. Alternatively, the lenses of the array of lenses are of large enough size to be in contact without leaving room between them. The support means of the lenses are then reduced to the surface of contact between the lenses and to holding the lenses in place in the back-lighting device. The second array 40 of lenses is an example of such an array where the lenses are in contact.

The reflective means 26 are disposed, in this embodiment, on the face of the lenses 38a, 38b situated on the side with the LEDs 16, as well as on the surface of the support means 44. To maximize the reflection of the recycled light toward the screen, the largest possible surface of the lenses 38a, 38b and of the support means 44 of the lenses is covered by the reflective means 26. As shown by FIG. 2, the reflective means 26 cover the entire surface of the first array 38 of lenses situated on the side with the LEDs 16, except for a hole 46a, 46b in each lens 38a, 38b allowing the light coming from the LED situated opposite the lens to pass through the lens 38a, 38b. The size of this hole 46a, 46b depends on the distance between the LEDs 16 and the first array 38 of lenses and on the angular aperture of the lighting of the LEDs 16. For example, the hole 46a, 46b can have a diameter of around two millimeters when the distance between the printed circuit 18 and the first lens array 38 is around one millimeter. The recycled light 34 incident on the reflective means 26 is thus reflected to form the reflected light 36, directed toward the screen.

The reflective means are disposed for example by bonding on the lens array. Alternatively, if the reflective means are composed of a metallic coating, this metallic coating is disposed for example on the lens array by metallization, for example in a vacuum. The metal used for the metallic coating is for example aluminum, which enables a good reflection of the recycled light and allows a good heat dissipation.

According to other embodiments of the invention, the support means 44 can be made of an opaque material different from the lenses. In this case, to enable the reflection of the recycled light, reflective means 26b are disposed on the surface of the support means 44 on the side with the screen, as represented in FIG. 2.

As illustrated in FIG. 3, the invention also concerns a heads-up display comprising an image projection system 10 according to the invention.

The projection system 10 described in reference to FIG. 1 forms an image with the aid of the TFT-LCD screen 12.

Downstream from the screen 12 in the direction of displacement of the light beam, said display comprises at least one semi-reflective plate 126 and a reflection device 125 interposed in the path of the image between the screen 12 and the semi-reflective plate 126, the reflection device 125 comprising one or more plane or concave mirrors, as represented in FIG. 3. In this figure, the path of the image is symbolized by three dotted arrows 30 which are reflected at the reflection device 125 before being displayed through the semi-reflective plate 126. The latter allows, by transparency, a displaying of the image beyond the semi-reflective plate and optionally an enlarging of said image, especially beyond the windshield of the vehicle so equipped, in the area of a virtual screen 130, produced with the help of the semi-reflective plate 126.

This plate 126 has a reflection power at least equal to 20%, which allows the user to see through the plate the road traveled by the vehicle, while having an elevated contrast allowing him to see the image displayed. As an alternative, the displaying of the image may occur in the area of the windshield of the vehicle equipped with said display.

The invention is not limited only to the described embodiments. In particular, the number of LEDs 16 may vary as a function of the surface of the screen being illuminated, the luminous power of each LED, and so forth.

The invention claimed is:

1. A projection system for a heads-up display, comprising:
    a liquid crystal screen; and
    a back-lighting device for said screen, wherein said back-lighting device comprises:
        at least one light source emitting light in the direction of the screen,
        at least one lens that collimates the light coming from the light source in the direction of the liquid crystal screen,
        at least one reflective material disposed on the face of the lens facing the screen and situated on the side of the black-lighting device with the light source,
        wherein the at least one reflective material:
            is disposed in front of the light source in the direction of the screen,
            comprises a hole that restricts the light emitted from the light source in the direction of the screen, and reflects, toward the screen, substantially all of the light propagating in the direction of the lens.

2. The projection system as claimed in claim 1, wherein the reflection obtained from the at least one reflective material is of specular type.

3. The projection system as claimed in claim 1, wherein the light source is a light-emitting diode.

4. The projection system as claimed in claim 1, wherein the device comprises a plurality of light sources.

5. The projection system as claimed in claim 4, wherein the device comprises a plurality of lenses forming at least one array of lenses connected by a lens holder that holds the lenses in place in the back-lighting device.

6. The projection system as claimed in claim 5, wherein the plurality of lenses and the lens holder are molded from the same material.

7. The projection system as claimed in claim 5, wherein the at least one reflective material is likewise disposed on the lens holder connecting the lenses.

8. The projection system as claimed in claim 5 wherein each lens array comprises a number of lenses equal to a number of light sources of the back-lighting device.

9. The projection system as claimed in claim 5, further comprising, successively and in order, between the light sources and the screen:
    the lens array or arrays,
    a diffuser,
    a prismatic filter or filters, and
    a polarization filter.

10. The projection system as claimed in claim 1, wherein the at least one reflective material is a reflective coating deposited on the lenses.

11. The projection system as claimed in claim 1, wherein the at least one reflective material is a metallic coating.

12. The projection system as claimed in claim 11, wherein the metallic coating includes aluminum.

13. The projection system as claimed in claim 1, wherein the back-lighting device comprises at least one filter for recycling the light emitted by the light source, situated between the light source and the screen, ensuring the transmission of some of the light toward the screen and the return of the light not transmitted toward the light source.

14. The projection system as claimed in claim 13, wherein the at least one light recycling filter is a polarization filter that lets through the light arriving at the polarization filter with a particular polarization and that reflects the light arriving at the polarization filter with a different polarization from the particular polarization.

15. The projection system as claimed in claim 13, wherein the at least one light recycling filter is a prismatic filter adapted to let through the light arriving at the prismatic filter with an angle of incidence less than a predetermined angle and in a given plane, and that reflects the remaining portion of the light.

16. The projection system as claimed in claim 15, wherein the back-lighting device comprises at least two prismatic filters, each one filtering according to the incidence of the light in a plane, and disposed so that the planes in which they filter the incidence are substantially perpendicular.

17. The projection system as claimed in claim 1, wherein the back-lighting device comprises a diffuser adapted to homogenize the light coming from the light source.

18. The projection system as claimed in claim 1, wherein the liquid crystal screen is inclined at a predefined angle with respect to a recycling filter or filters.

19. The projection system as claimed in claim 1, wherein the device comprises a box surrounding the space of the device between the light source and the screen and whose interior walls are reflective.

20. A heads-up display, comprising an image projection system as claimed in claim 1.

* * * * *